US011218062B2

(12) United States Patent
Oner et al.

(10) Patent No.: US 11,218,062 B2
(45) Date of Patent: Jan. 4, 2022

(54) DOUBLE-STATOR SINGLE-WINDING SWITCHED RELUCTANCE MACHINE

(71) Applicant: Enedym Inc., Hamilton (CA)

(72) Inventors: Yasemin Oner, Hamilton (CA); Berker Bilgin, Hamilton (CA); Ali Emadi, Burlington (CA)

(73) Assignee: ENEDYM INC., Hamilton (CA)

( * ) Notice: Subject to any disclaimer, the term of this patent is extended or adjusted under 35 U.S.C. 154(b) by 63 days.

(21) Appl. No.: 16/682,191

(22) Filed: Nov. 13, 2019

(65) Prior Publication Data

US 2020/0161949 A1    May 21, 2020

Related U.S. Application Data

(60) Provisional application No. 62/768,181, filed on Nov. 16, 2018.

(51) Int. Cl.
| | |
|---|---|
| *H02K 16/02* | (2006.01) |
| *H02K 19/10* | (2006.01) |
| *H02K 19/12* | (2006.01) |
| *H02K 1/24* | (2006.01) |
| *H02K 3/12* | (2006.01) |
| *H02P 25/08* | (2016.01) |
| *H02K 19/32* | (2006.01) |

(52) U.S. Cl.
CPC ............ *H02K 16/02* (2013.01); *H02K 1/246* (2013.01); *H02K 3/12* (2013.01); *H02K 19/103* (2013.01); *H02K 19/12* (2013.01); *H02K 19/32* (2013.01); *H02P 25/08* (2013.01)

(58) Field of Classification Search
CPC ............ H02K 1/24; H02K 1/246; H02K 3/12; H02K 3/28; H02K 3/527; H02K 11/0042; H02K 11/0094; H02K 16/02; H02K 16/04; H02K 19/12; H02K 19/28; H02K 19/30; H02K 19/32; H02K 19/103; H02P 25/08

USPC ....... 310/40 R, 51, 180, 183, 186, 190, 191, 310/198, 210

See application file for complete search history.

(56) References Cited

U.S. PATENT DOCUMENTS

| 5,260,635 | A * | 11/1993 | Bahn ..................... H02P 25/089 318/701 |
|---|---|---|---|
| 5,319,297 | A * | 6/1994 | Bahn ..................... H02P 25/098 318/701 |
| 7,902,712 | B2 * | 3/2011 | Nakamasu ............. H02K 16/04 310/156.57 |
| 8,159,104 | B1 * | 4/2012 | Bojiuc ................... H02K 16/04 310/181 |
| 9,621,014 | B2 | 4/2017 | Yang et al. |
| 9,647,520 | B2 | 5/2017 | Tojima et al. |

(Continued)

*Primary Examiner* — Tulsidas C Patel
*Assistant Examiner* — Rashad H Johnson
(74) *Attorney, Agent, or Firm* — Bereskin & Parr LLP/S.E.N.C.R.L., s.r.l.

(57) ABSTRACT

A three-phase switched reluctance machine has a rotor, a first stator and a second stator. The rotor, first stator and second stator are coaxially and concentrically disposed. The rotor and both the first stator and second stator have corresponding poles. Only one of the stators has coils wound about its poles, while the other stator does not have any coils. A defined relationship between the number of rotor poles, the number of stator poles on the first stator and the number of stator poles on the second stator may improve the torque quality of the switched reluctance machine.

20 Claims, 11 Drawing Sheets

(56) References Cited

U.S. PATENT DOCUMENTS

| | | | |
|---|---|---|---|
| 2011/0241465 A1* | 10/2011 | Anghel | H02K 19/28 |
| | | | 310/114 |
| 2011/0316366 A1 | 12/2011 | Abbasian et al. | |
| 2013/0002058 A1* | 1/2013 | McIntosh | H02K 1/185 |
| | | | 310/43 |
| 2013/0093275 A1* | 4/2013 | Kim | H02K 16/04 |
| | | | 310/114 |
| 2016/0365780 A1* | 12/2016 | Krishnamurthy | H02K 19/103 |

\* cited by examiner

DOUBLE-STATOR SINGLE-WINDING SWITCHED RELUCTANCE MACHINE

CROSS-REFERENCE TO RELATED APPLICATION

This application claims the benefit of the U.S. Provisional Application No. 62/768,181, filed on Nov. 16, 2018, the entirety of which is incorporated herein by reference.

FIELD OF THE INVENTION

The described embodiments relate generally to switched reluctance machines, and in particular, to switched reluctance machines having a rotor and two stators.

BACKGROUND

The following is not an admission that anything discussed below is part of the prior art or part of the common general knowledge of a person skilled in the art.

Electric machines have been applied as motors and generators in a wide range of industries for more than a century. A reluctance machine is an electric machine in which torque is produced by the tendency of the movable part of the machine to move into a position where the inductance of an excited winding is maximized. A switched reluctance machine is a type of a reluctance machine where the windings are energized as a function of the position of the movable part of the machine. Various examples of switched reluctance machines have been described.

U.S. Pat. No. 9,647,520 of Tojima et al. purports to describe a double stator switched reluctance rotating machine that includes an annular rotor, an outer stator that is disposed outside the rotor, and an inner stator that is disposed inside the rotor, and has a structure in which the outer and inner stators are connected to each other in parallel.

U.S. Pat. No. 9,621,014 of Yang et al. describes a double-rotor switched reluctance machine that includes a stator, a first rotor, and a second rotor. The stator and the first rotor operate as a first electric machine and the stator and the second rotor operate as a second electric machine. Each electric machine has an output torque profile that fluctuates periodically between a maximum and a minimum instantaneous torque. The double-rotor switched reluctance machine is configured so that when the first and second electric machines are operated at a common electrical frequency, the first and second maximum instantaneous torques are temporally offset, thereby reducing the overall torque ripple of the switched reluctance machine. Yang also describes a double-rotor switched reluctance machine that is configured so that the first and second rotors are radially offset from each other to reduce a net radial force imposed on the stator by the operation of the first and second electric machines.

United States Patent Application Publication No. 2011/0316366 of Abbasian et al. purports to describe a switched reluctance apparatus and method of operating the same. The apparatus has an inner stator having a plurality of poles, a rotor disposed radially outward of the inner stator and having a plurality of segments serving as poles, and an outer stator disposed radially outward of the rotor and having a plurality of poles. A respective winding is disposed between every pair of adjacent poles of either stator. The apparatus operates with a plurality of separately excitable phases, a given phase being excited by energizing the windings corresponding to the given phase. Excitation of a given phase causes induction of magnetic fluxes traversing a region substantially confined to the region of the stators and rotor segments corresponding to the given phase, and causes a substantial amount of flux to enter rotor segments not in the radial direction but perpendicular to the radial direction.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

An aspect of the present disclosure relates to a switched reluctance machine having a rotor, a first stator and a second stator. The rotor, first stator and second stator can be coaxially and concentrically disposed. The rotor and both the first stator and second stator have salient poles. In embodiments described herein, only one of the stators has coils wound about its poles, while the other stator does not have any coils.

In an aspect of the disclosure, there is provided a switched reluctance machine that includes an axially extending shaft; an axially extending rotor mounted to the shaft, the rotor having a plurality of salient rotor poles; an axially extending outer stator disposed coaxially and concentrically with the rotor, the outer stator having a plurality of salient outer stator poles protruding radially from the outer stator towards the rotor poles; a plurality of electrical coils wound about the outer stator poles, the plurality of electrical coils including a plurality of separate phase coils defining a plurality of phases of the switched reluctance machine, where the plurality of phases of the switched reluctance machine includes at least three phases; and an axially extending inner stator disposed coaxially and concentrically with the rotor and the outer stator, the inner stator defining a plurality of second stator poles; where electrical coils are wound about only the outer stator poles.

In some embodiments, the inner stator may be disposed between the outer stator and the rotor.

In some embodiments, the rotor may be disposed between the outer stator and the inner stator.

In some embodiments, the number of outer stator poles in the plurality of salient outer stator poles may be an integer multiple of the number of phases in the plurality of phases.

In some embodiments, the number of outer stator poles in the plurality of salient outer stator poles can be defined according to $N_{s1}=N_{ph} \times \gcd(N_{s1}, N_r)$, where $N_{s1}$ is the number of outer stator poles in the plurality of salient outer stator poles, $N_{ph}$ is the number of phases in the plurality of phases, $N_r$ is the number of rotor poles in the plurality of salient rotor poles, and gcd is the greatest common divisor.

In some embodiments, the number of inner stator poles in the plurality of inner stator poles may be an integer multiple of the number of outer stator poles in the plurality of salient outer stator poles.

In some embodiments, the number of inner stator poles in the plurality of inner stator poles can be defined according to $N_2 = N_r + \gcd(N_{s1}, N_r)$, where $N_{s1}$ is the number of outer stator poles in the plurality of salient outer stator poles, $N_{s2}$ is the number of inner stator poles in the plurality of inner stator poles, $N_r$ is the number of rotor poles in the plurality of salient rotor poles, and gcd is the greatest common divisor.

In accordance with a broad aspect, there is provided a switched reluctance machine including a rotor having a plurality of salient rotor poles; a first stator disposed concentrically with the rotor, the first stator having a plurality of salient first stator poles protruding radially from the first stator towards the rotor poles; a plurality of electrical coils wound about the first stator poles, the plurality of electrical coils including a plurality of separate phase coils defining a plurality of phases of the switched reluctance machine; and a second stator disposed concentrically with the rotor and the first stator, the second stator defining a plurality of second stator poles; where the switched reluctance machine omits any electrical coils wound about the second stator poles.

In some embodiments, the second stator may be disposed between the rotor and the first stator.

In some embodiments, the rotor may be disposed between the first stator and the second stator.

In some embodiments, the switched reluctance machine can have at least three phases defined by the plurality of electrical coils.

In some embodiments, the number of first stator poles in the plurality of salient first stator poles may be an integer multiple of the number of phases in the plurality of phases.

In some embodiments, the number of first stator poles in the plurality of salient first stator poles can be defined according to $N_{s1} = N_{ph} \times \gcd(N_{s1}, N_r)$, where $N_{s1}$ is the number of first stator poles in the plurality of salient first stator poles, $N_{ph}$ is the number of phases in the plurality of phases, $N_r$ is the number of rotor poles in the plurality of salient rotor poles, and gcd is the greatest common divisor.

In some embodiments, the number of second stator poles in the plurality of second stator poles may be an integer multiple of the number of first stator poles in the plurality of salient first stator poles.

In some embodiments, the number of second stator poles in the plurality of second stator poles can be defined according to $N_2 = N_r \times \gcd(N_{s1}, N_r)$, where $N_{s1}$ is the number of first stator poles in the plurality of salient first stator poles, $N_2$ is the number of second stator poles in the plurality of second stator poles, $N_r$ is the number of rotor poles in the plurality of salient rotor poles, and gcd is the greatest common divisor.

In accordance with a broad aspect there is provided a method of manufacturing a switched reluctance machine. The method can include providing a rotor having a plurality of salient rotor poles; defining a number of phases for the switched reluctance machine; determining a number of first stator poles from the number of salient rotor poles and the number of phases; mounting a first stator concentrically with the rotor, the first stator having a plurality of salient first stator poles protruding radially from the first stator towards the rotor poles, where the plurality of salient first stator poles has the number of first stator poles; determining a number of second stator poles from the number of salient rotor poles and the number of first stator poles; mounting a second stator concentrically with the rotor and the first stator, the second stator having a plurality of second stator poles, where the plurality of second stator poles has the number of second stator poles; and winding a plurality of electrical coils about only the first stator poles, the plurality of electrical coils including a plurality of separate phase coils defining the number of phases of the switched reluctance machine.

In some embodiments, the second stator can be mounted between the rotor and the first stator.

In some embodiments, the rotor can be mounted between the first stator and the second stator.

In some embodiments, the method may include optimizing a shape of the second stator using finite element analysis by analyzing at least one of an outer stator-side angle, a rotor-side angle, a second stator thickness, and a second stator pole circumferential width.

In some embodiments, the method may include optimizing a shape of the rotor using finite element analysis by analyzing at least one of an outer stator-side angle, an inner stator-side angle, a rotor thickness, and a rotor pole circumferential width.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

DRAWINGS

For a better understanding of the various embodiments described herein, and to show more clearly how these various embodiments may be carried into effect, reference will be made, by way of example, to the accompanying drawings which show at least one example embodiment and which will now be briefly described.

DETAILED DESCRIPTION

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the word it modifies. This may include a deviation of at least ±5% of the modified term if this deviation would not negate the meaning of the word it modifies.

As used in this application, the singular forms "a", "an" and "the" include plural references unless the content clearly dictates otherwise.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

In embodiments comprising an "additional" or "second" component, the second component as used herein is physically different from the other components or first component. A "third" component is different from the other, first, and second components, and further enumerated or "additional" components are similarly different.

The term "and/or" as used herein means that the listed items are present, or used, individually or in combination. In effect, this term means that "at least one of" or "one or more" of the listed items is used or present.

Figure 1:
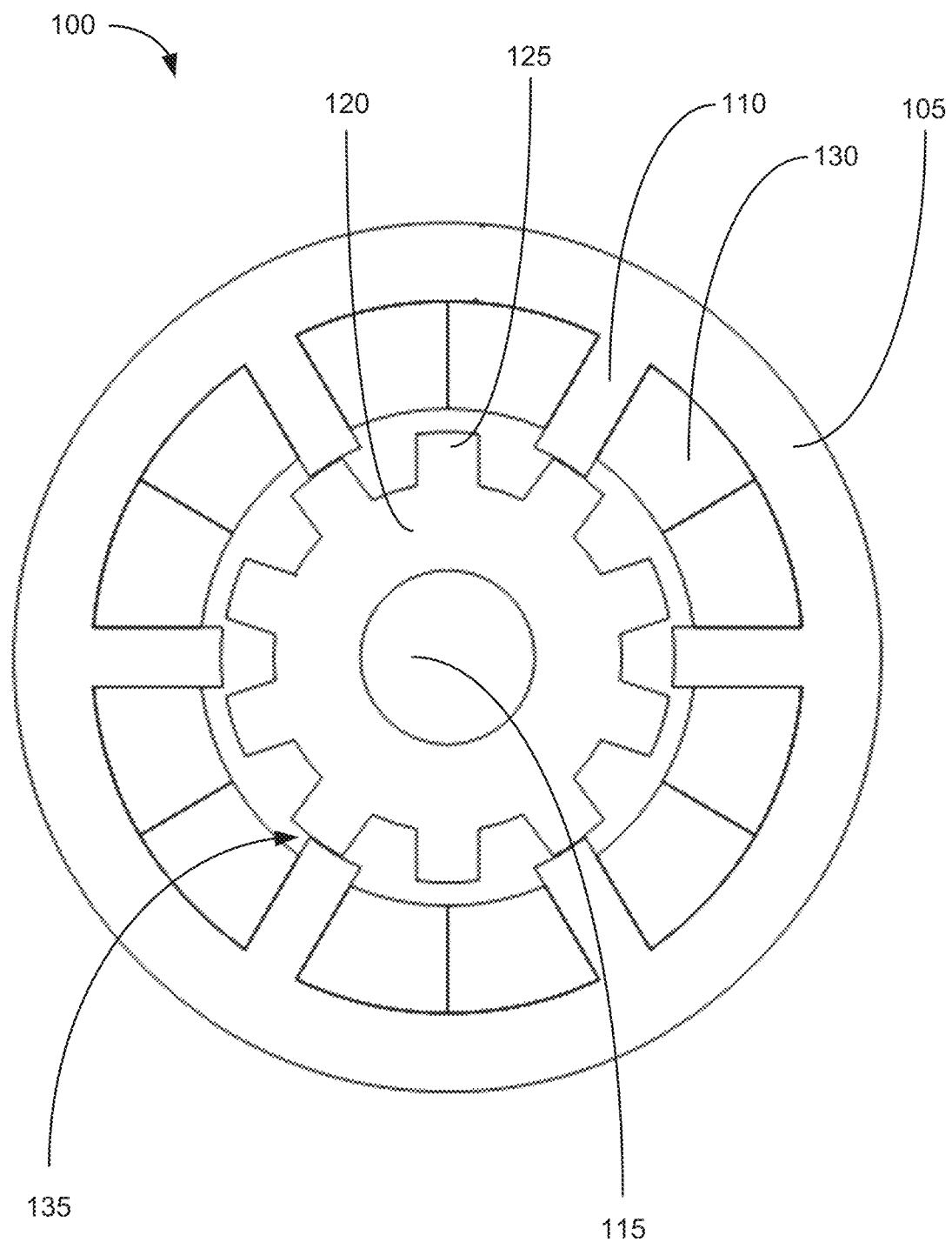
FIG. 1 shows a cross sectional view of a switched reluctance machine.

Embodiments described herein relate to switched reluctance machines (SRMs). FIG. 1 shows a cross-sectional view of an example switched reluctance machine 100. Switched reluctance machine 100 is an example of a switched reluctance machine with six (6) stator poles and ten (10) rotor poles. The switched reluctance machine 100 includes salient poles on the rotor and the stator. Switched reluctance machine 100 also has concentrated coil windings. Coil windings are provided around each stator pole.

The salient pole configuration on both the rotor and the stator provides a relatively simple manufacturing process and robust operation for SRM. Concentrated coil windings of the SRM may provide smaller end turns and a simpler manufacturing process.

As shown, switched reluctance machine 100 includes a stator 105 and a rotor 120. The rotor 120 is mounted to a rotatable shaft 115. The stator 105 and rotor 120 can be disposed concentrically and coaxially with one another and with the shaft 115. In switched reluctance machine 100, the rotor 120 is positioned radially inward of the stator 105.

Both the stator 105 and rotor 120 include a plurality of protrusions that define salient teeth or salient poles. The stator 105 has a stator core that includes a plurality of stator teeth 110, in this case six stator teeth 110. The rotor 120 includes a plurality of rotor teeth 125, in this case ten rotor teeth 125. The stator teeth 110 protrude radially from the stator core towards the rotor 120. Similar, the rotor teeth 125 protrude radially from the rotor 120 towards the stator 105.

An air gap 135 is also provided between the rotor poles 125 and the stator poles 110. The shaft 115 may be positioned within a central bore of the machine 100. Switched reluctance machine 100 is an example of a six stator pole and ten rotor pole switched reluctance machine with concentrated coil windings. That is, the stator 105 has coil windings 130 around each stator tooth 110.

The coils 130 are wound around each stator tooth 110 and connected together to create the phase windings for each phase. SRMs can be designed with varying numbers of stator and rotor poles, and varying number of phases. In general, SRMs typically do not include excitation sources on the rotor 120.

In an SRM such as SRM 100, the windings 130 in different phases are energized as a function of the position of rotor 120. The current in the windings 130 of different phases can be controlled using a suitable controller.

Figure 2:
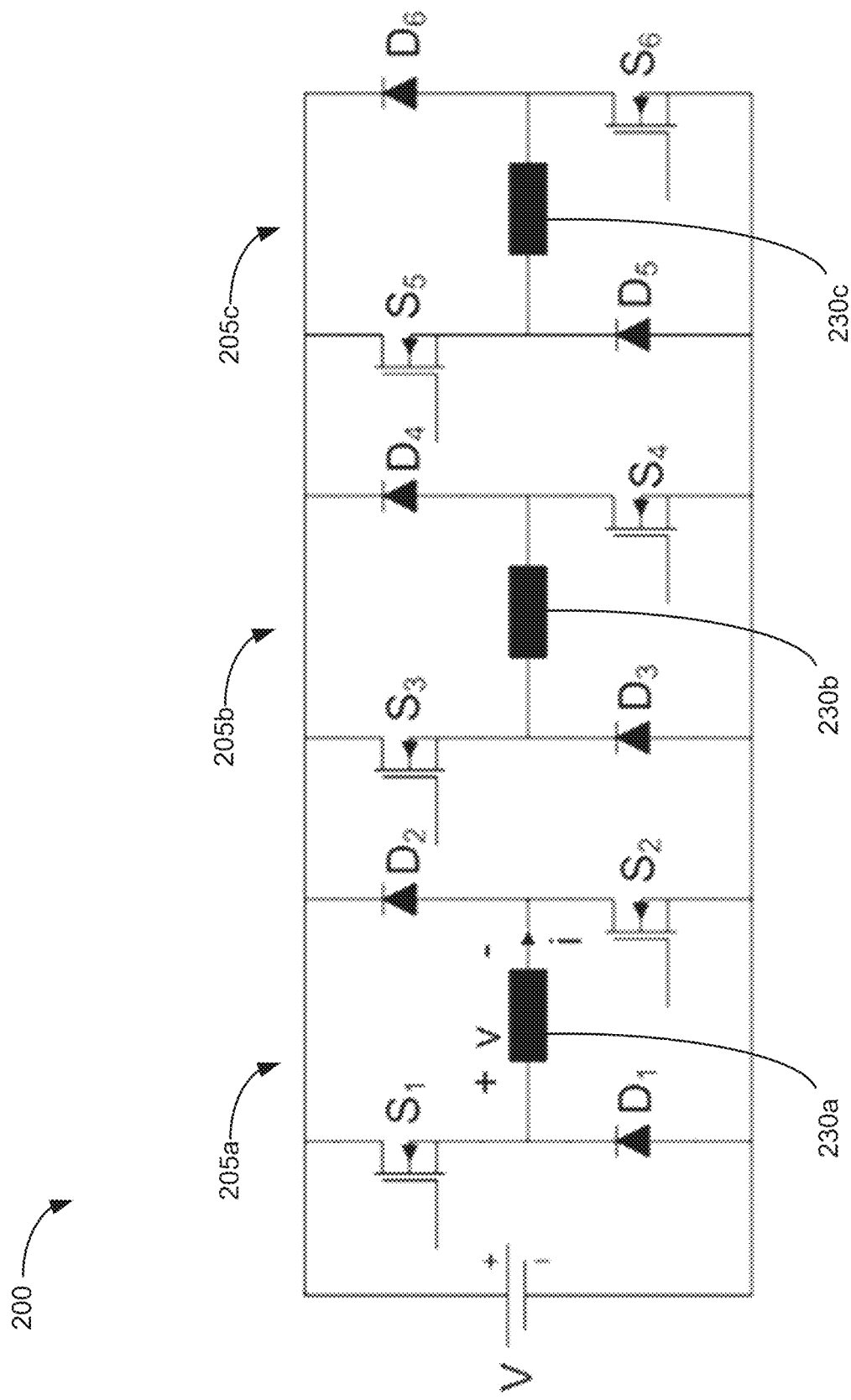
FIG. 2 shows a circuit diagram of an example three-phase asymmetric bridge converter.

In some examples, the current in each phase may be controlled by an asymmetric bridge converter. FIG. 2 shows an example circuit diagram of a three-phase asymmetric bridge converter 200 for a three-phase SRM such as SRM 100. In the asymmetric bridge converter 200, a power source is coupled to a plurality of phase coils 230a-230c by switching sections 205a-205c. The individual phase coils 230a-230c may be energized and de-energized so that only one phase is active (i.e. receiving current) at a given time.

In the SRM 100, the phase windings 130 for different phases are electrically isolated from each other. The asymmetric bridge converter 200 can electrically isolate the phase coils 230a, 230b and 230c from one another.

Embodiments described herein generally relate to switched reluctance machines having a rotor and two separate stators. Each of the rotor, first stator and second stator can include a plurality of poles. One of the stators can include electrical coils wound around its stator poles. The other stator can omit any electrical coils.

The stators can include an inner stator and an outer stator. In some examples, the coils may be wound around the poles of the outer stator.

Figure 3:
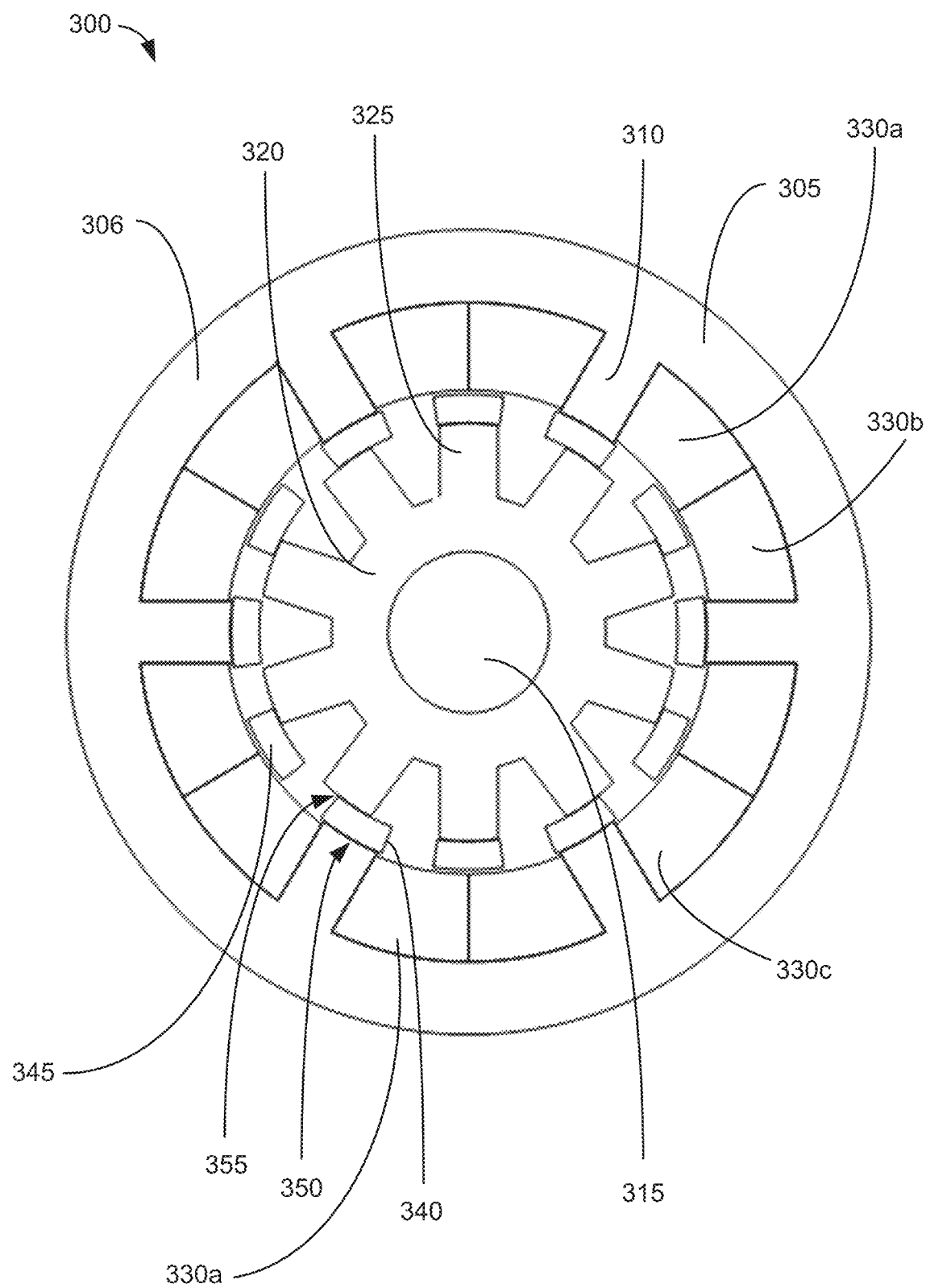
FIG. 3 shows a cross sectional view of an example switched reluctance machine in accordance with an embodiment.
Figure 4:
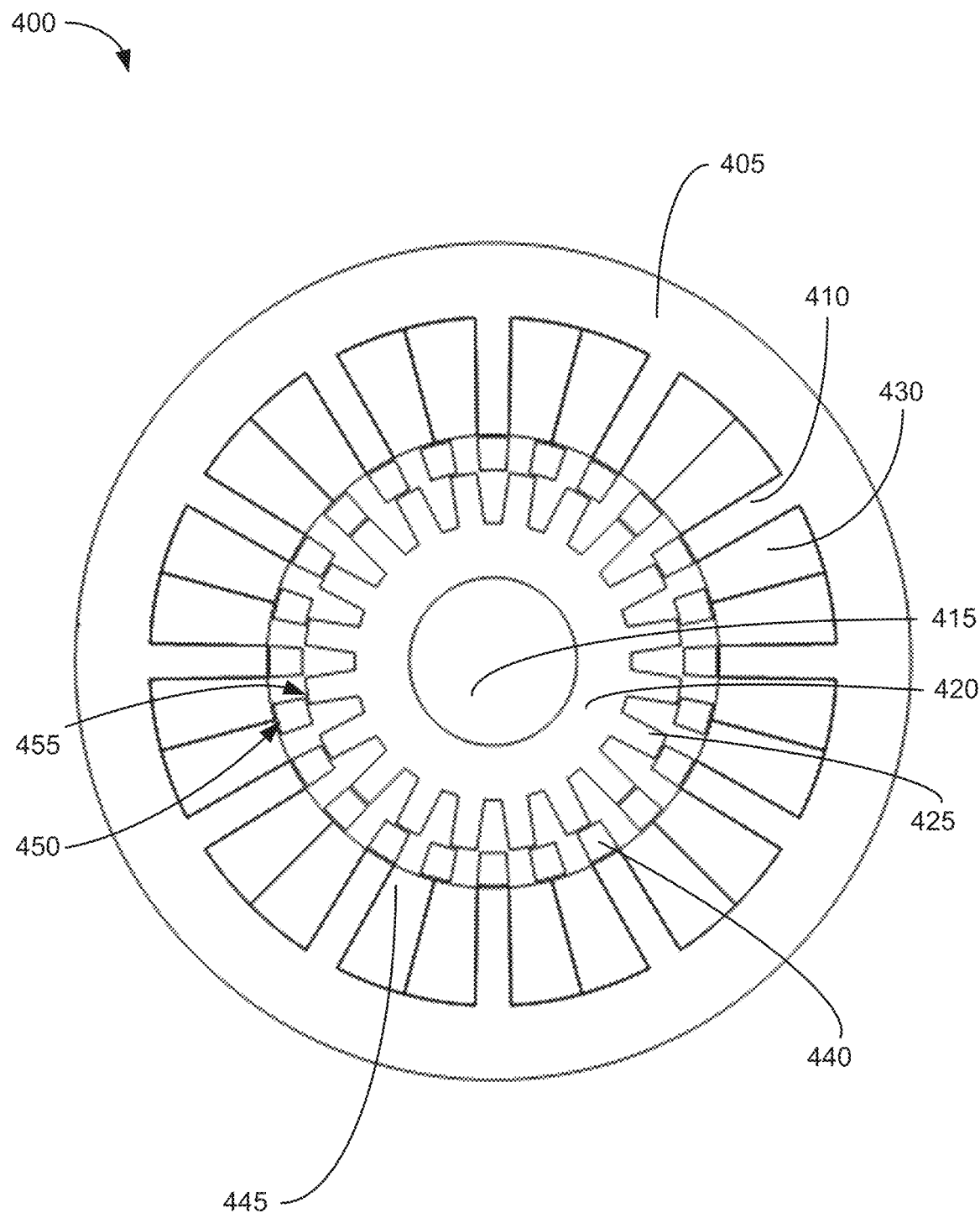
FIG. 4 shows a cross sectional view of another example switched reluctance machine in accordance with an embodiment.
Figure 11:
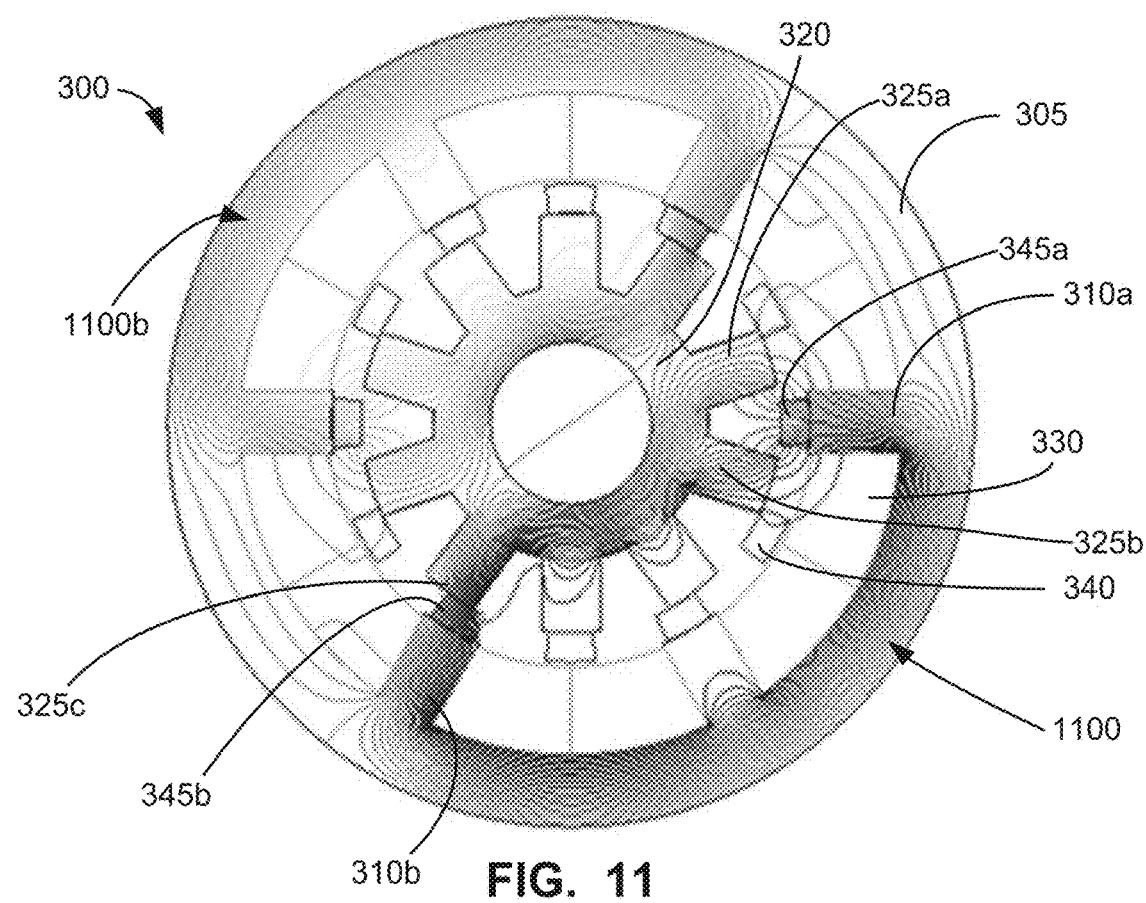
FIG. 11 shows a cross-sectional view of the switched reluctance machine of FIG. 3 with a magnetic flux path illustrated.

In some embodiments, the stator that omits any electrical coils may be positioned between the rotor and the other stator (see e.g. FIGS. 3, 4, and 11). In other embodiments, the rotor may be positioned between the two stators (see e.g. FIGS. 6, 7, and 12).

Both stators can be disposed concentrically with the rotor. The rotor can be mounted to a rotatable shaft. The stators and rotor can be disposed concentrically with the shaft.

Embodiments described herein may also provide a defined relationship between the number of rotor poles, the number of stator poles on the first (outer) stator and the number of stator poles on the second (inner) stator. For example, in some embodiments a switched reluctance machine may be configured so that the relationship between the number of rotor poles ($N_r$), the number of poles in the first (outer) stator ($N_{s1}$), which has coils, and the number of poles in the second (inner) stator ($N_{s2}$), which does not have coils, is $N_2=N_r+p$ where $p=gcd(N_{s1}, N_r)$, and $N_2=k \times N_{s1}$. In embodiments where the second (inner) stator is positioned between the rotor and the first stator, the relationship may be further constrained by requiring k to be an integer greater than one (1), i.e. 2, 3 . . . This may provide switched reluctance machines with improved torque quality.

Switched reluctance machines configured in accordance with the embodiments described herein may be implemented in various motor drive systems, such as powertrain applications, household appliances, drones, and tools for example.

Referring now to FIG. 3, shown therein is a cross-sectional view of a switched reluctance machine 300 in accordance with an embodiment. Switched reluctance machine 300 is an example of a switched reluctance machine with six outer stator poles, twelve inner stator poles and ten rotor poles. As shown in the example of FIG. 3, the second (inner) stator of switched reluctance machine 300 omits any electrical coil windings.

Switched reluctance machine 300 includes a first (outer) stator 305, a second (inner) stator 340 and a rotor 320. The rotor 320 can be mounted to a rotatable shaft 315. The rotor 320 can rotate during operation of the switched reluctance machine 300 while the second (inner) stator 340 and first (outer) stator 305 remain fixed or stagnant. Rotation of the rotor 320 can drive rotation of the shaft 315.

The shaft 315 can extend axially along a longitudinal direction of the switched reluctance machine 300. The shaft 315 may thus define a central longitudinal axis of the switched reluctance machine 300. The shaft 315 may define a rotation axis about which the rotor 320 is rotatable. As shown, the first stator 305, second stator 340 and rotor 320 can all be disposed concentrically and co-axially about the central axis of machine 300.

Alternately, the shaft may be positioned elsewhere within the switched reluctance machine 300. For example, the shaft may be coupled to one or both ends of the rotor 320.

In the example shown in FIG. 3, the second stator 340 is positioned between the rotor 320 and the first stator 305. Alternately, the second stator 340 may be positioned inward of the rotor 320 as described herein below. That is, the rotor 320 may be positioned between the first stator 305 and the second stator 340 in alternate examples.

The rotor 320 includes a plurality of radially extending teeth or protrusions. These protrusions define a plurality of salient rotor poles 325 of the rotor 320. The rotor 320 can include rotor poles that extend radially towards both the first stator 305 and the second stator 340. As shown in FIG. 3, the rotor poles 325 extend from the rotor 320 outwardly towards the second stator 340 and the first stator 305.

The first stator 305 is disposed concentrically with the rotor 320. The first stator 305 includes a stator core 306 and a plurality of salient teeth defining first stator poles 310. The first stator poles 310 protrude radially from the first stator core 306.

As shown in FIG. 3, the first stator poles 310 protrude radially inward from the stator core 306. The stator poles 310 may be spaced substantially evenly around the circumferential direction of the first stator 305. The space between a pair of first stator teeth 310 that are adjacent one another around the circumference of the first stator 305 may be referred to as a slot.

The switched reluctance machine 300 also includes a second stator 340. The second, inner stator 340 is disposed concentrically with the rotor 320 and the first stator 305. As with the first stator 305, the second stator 340 includes a plurality of second stator poles 345. The plurality of second stator poles 345 are also spaced apart around the circumferential direction of the second stator 340 defining second stator slots there between.

The switched reluctance machines 300 also includes a plurality of electrical coils 330. The electrical coils 330 can be wound around the poles 310 of the first, outer stator 305. The coils 330 can be provided in a concentrated winding scheme about each pole 310. Each stator pole 310 may have a corresponding coil wound around that pole 310.

As shown in FIG. 3, coils 330 are wound about only the first stator poles 310. That is, the switched reluctance machine 300 omits any electrical coils about the second stator poles 345. Accordingly, the slots between adjacent poles 345 of the second stator 340 can be substantially void.

In some examples, the second stator 340 may thus omit any excitation source. The switched reluctance machine 300 may also omit any excitation sources (i.e. magnets or electromagnets) on the rotor 320.

The plurality of electrical coils 330 can include a plurality of separate phase coils, i.e. coils corresponding to different phases of the switched reluctance machine 300. The electrical coils 330 may thus define the plurality of phases of the switched reluctance machine 300. The switched reluctance machines described herein may include varying numbers of phases, however, in general each switched reluctance machine can include at least three separate phases.

In the example of reluctance machine 300, three separate phase coils 330a, 330b and 330c are shown. Each phase coil 330a-330c is wound about (i.e. around) a corresponding stator pole 310 of the first stator 305. The electrical coils 330 in switched reluctance machine 300 are arranged with concentrated windings around the stator teeth 310.

In some cases, a phase coil 330 corresponding to a particular phase may include pole winding sections wound around multiple stator poles corresponding to the same phase.

A first, outer air gap 350 is provided between the first stator poles 310 and the second stator poles 345. A second, inner air gap 355 is provided between the second stator poles 345 and the rotor poles 325.

Electrical current can be provided to the coil windings 330 to induce an electromagnetic field. The coil windings 330 can thereby excite the stator poles 310 by inducing magnetic flux in the stator poles 310. The magnetic flux can then pass through the second stator poles 345 to the rotor 320. The rotor 320 can be rotatable to align the rotor poles 325 with the second stator poles 345 as a result of the induced magnetic flux. The rotor 320 may align the rotor poles 325 with the second stator poles 345 of the second stator 340, since the flux induced by the coils windings 330 around the first stator poles 310 passes through the second stator poles 345 and then to the rotor poles 310.

The flux can penetrate the air gap 350 between the first stator poles 310 and the second stator poles 345. The flux can then penetrate the air gap 355 between the second stator poles 345 and the rotor poles 325 and then go into the rotor 320. An example of a magnetic flux path through the switched reluctance machine 300 is shown in FIG. 11.

FIG. 11 illustrates an example magnetic flux path 1100 through switched reluctance machine 300. As shown in FIG. 11, flux induced in a first stator pole 310a can penetrate the air gap 350 between the first stator pole 310a and second stator pole 345a. The flux can then pass through the second stator pole 345a and penetrate the second air gap 355 between the second stator pole 345a and rotor poles 325a and 325b. The flux can split into rotor poles 325a and 325b and enter the rotor 320.

The flux can then travel along the rotor 320 to rotor pole 325c where it again penetrates the air gap 355 to second stator pole 345b. The flux then passes through second stator pole 345b, penetrates the first air gap 350 and enters first stator pole 310b. As shown here, the flux passes between the rotor 320 and the first stator pole 310b primarily via a single rotor pole 325b in this position. The flux then enters the core 306 of stator 305 and returns to first stator pole 310a where it substantially completes a magnetic flux path 1100.

As will be appreciated, the direction of the magnetic flux path 1100 is described for clarity, and the path does not have a defined beginning or end.

The flux between the second stator poles 345 (corresponding to the excited first stator poles 310) and the corresponding rotor poles 325 tends to align the rotor poles 325 with the second stator poles 345 so that the rotor 320 rotates. This can provide a motoring operation in the switched reluctance machine 300.

A controller or processor may also be included with reluctance machine 300. The controller may operate to drive the reluctance machine 300, e.g. by controlling the current provided to the phase coils 330a-330c. For instance, the controller may control the operation of a converter, such as the asymmetric bridge converter 200 shown in FIG. 2.

The controller may be any suitable processor, controller or digital signal processor that can provide sufficient processing power depending on the configuration, purposes and requirements of the reluctance machine as is known by those skilled in the art. Similarly, the processor may be coupled to volatile and non-volatile memory required for the processes performed by the reluctance machine 300.

For example, the processor may be a high performance general processor. In some embodiments, the processor may include more than one processor with each processor being configured to perform different dedicated tasks. In some embodiments, the processor may be provided using specialized hardware such as a field programmable gate array (FPGA) or application specific circuitry. In some embodiments, the processor may be provided by a desktop computer, a laptop computer, a tablet, a handheld device such as a smartphone and the like.

As shown in FIG. 3, the switched reluctance machine 300 includes windings only on the first stator poles 310. Coils are omitted on the second stator poles 345, and thus the second stator poles 345 are not directly energized. The arrangement of the first stator poles 310, second stator poles 345 and rotor poles 320 in embodiments described herein can reduce the torque ripple in switched reluctance machine as compared to conventional switched reluctance machines. Additionally, providing coils only on the first stator poles 310 may facilitate manufacturing of the switched reluctance machine 300 as compared to requiring coils on the second stator poles 345 as well.

As will be appreciated, the structure of reluctance machine 300 is merely exemplary, and various alternative reluctance motor configurations can be provided with different numbers of rotor teeth, stator teeth and phases. However, in embodiments described herein the relationship between the numbers of rotor poles, second stator poles, first stator poles, and phases may be defined to ensure a reduction in torque ripple.

Torque ripple can be expressed as $$T_{ripple} = \frac{T_{max} - T_{min}}{T_{avg}} \quad (1)$$

where $T_{max}$ is the maximum value of the torque, $T_{min}$ is the minimum value, and $T_{avg}$ is the average value. As can be seen from equation (1), increasing the average torque can reduce the torque ripple. Average torque can be calculated as $$T_{avg} = \frac{S \cdot W_{co}}{2\pi} \quad (2)$$

where $W_{co}$ is co-energy and S is the number of strokes.

The number of strokes can be determined from the number of phases and the number of rotor poles as shown in equation (3):

$$S = N_{ph} N_r \quad (3)$$

where $N_{ph}$ is the number of phases and $N_r$ is the number of rotor poles.

In embodiments described herein, the number of first stator poles, number of second stator poles, number of rotor poles, and number of phases may be defined to reduce the torque ripple of the switched reluctance machine. In some embodiments, the number of first stator poles may be determined based on the number of phases and the number of rotor poles. In some embodiments, the number of second stator poles can be determined based on the number of first stator poles and the number of rotor poles.

For instance, the relationship between the number of rotor poles ($N_r$) the number of first stator poles ($N_{s1}$) and the number of second stator poles ($N_{s2}$) can be defined according to:

$$N_{ph} = \frac{N_{s1}}{p} \quad (4)$$

and $$N_{s2} = N_r + p \quad (5)$$

where p is defined as:

$$p = gcd(N_{s1}, N_r) \quad (6)$$

By re-arranging equation (5) and combining it with equation (4), the number of phases ($N_{ph}$) can be defined as:

$$N_{ph} = \frac{N_{s1}}{N_{s2} - N_r} \quad (7)$$

By inserting equation (7) into equation (3), the number of strokes can be expressed as:

$$S = \frac{N_{s1} N_r}{N_{s2} - N_r} \quad (8)$$

Finally, by inserting equation (8) into equation (2), average torque can be related to the number of stator and rotor poles as shown in equation (9):

$$T_{avg} = \frac{W_{co}}{2\pi} \frac{N_{s1}N_r}{(N_{s2} - N_r)} \quad (9)$$

The configuration of the switched reluctance machines described herein can improve the average torque of the switched reluctance machines as shown in equation (9), by constraining the relationships between the number of first stator poles, the number of second stator poles, the number of rotor poles and the number of phases. Additionally, the arrangement of the stator poles and rotor poles may improve the co-energy $W_{co}$.

In embodiments described herein, the number of first stator poles in the plurality of salient first stator poles can be defined as an integer multiple of the number of phases in the plurality of phases. For instance, by combining equations (6) and (4), the number of first stator poles in the plurality of salient first stator poles can be defined according to:

$$N_{s1} = N_{ph} \times \gcd(N_{s1}, N_r) \quad (10)$$

where $N_{s1}$ is the number of first stator poles in the plurality of salient first stator poles, $N_{ph}$ is the number of phases in the plurality of phases, $N_r$ is the number of rotor poles in the plurality of salient rotor poles, and gcd is the greatest common divisor.

In embodiments described herein, the number of second stator poles can be defined based on the number of rotor poles and the number of first stator poles. For instance, by combining equations (6) and (4), the number of second stator poles in the plurality of salient second stator poles can be defined according to:

$$N_{s2} = N_r + \gcd(N_{s1}, N_r) \quad (11)$$

where $N_{s1}$ is the number of first stator poles in the plurality of salient first stator poles, $N_{s2}$ is the number of second stator poles in the plurality of second stator poles, $N_r$ is the number of rotor poles in the plurality of salient rotor poles, and gcd is the greatest common divisor.

In some embodiments, the relationship between the number of poles on the second stator and the number of poles on the first stator can be further constrained. For instance, the number of second stator poles in the plurality of second stator poles may be defined as an integer multiple of the number of first stator poles in the plurality of salient first stator poles:

$$N_{s2} = k \times N_{s1} \quad (12)$$

where k is an integer. In embodiments where the second stator is positioned between the first stator and the rotor, k can be any integer equal to or greater than 2.

Referring now to FIG. 4, shown therein is another example embodiment of a switched reluctance machine 400. Switched reluctance machine 400 is similar to switched reluctance machine 300 in that a second inner stator 440 is positioned between a first outer stator 405 and a rotor 420.

The rotor 420 can again be mounted to a rotatable shaft 415. The rotor 420, second stator 440 and first stator 405 can be disposed concentrically and co-axially in switched reluctance machine 400.

In the example illustrated, switched reluctance machine 400 includes twelve outer stator poles 410, twenty-four inner stator poles 445 and twenty rotor poles 425. As with switched reluctance machine 300, switched reluctance machine 400 only includes electrical coils 430 wound around the first stator poles 410. The second stator 440 omits any electrical coils.

The coils 430 define a plurality of phases for the switched reluctance machine 400. In the example illustrated, the coils define three phases for the switched reluctance machine 400. The electrical coils 430 in machine 400 are arranged with concentrated windings around the stator teeth 410.

Electrical current can be provided to the coil windings 430 to induce an electromagnetic field. The coil windings 430 can thereby excite the stator poles 410 by inducing magnetic flux in the stator poles 410. The magnetic flux can then pass through the second stator poles 445 to the rotor 420. The rotor 420 can be rotatable to align the rotor poles 425 with the stator poles 445 as a result of the induced magnetic flux.

The flux can penetrate the air gap 450 between the first stator poles 410 and the second stator poles 445. The flux can then penetrate the air gap 455 between the second stator poles 445 and the rotor poles 425 and then go into the rotor 420. The flux between the second stator poles 445 (corresponding to the excited first stator poles 410) and the corresponding rotor poles 425 tends to align the rotor poles 425 with the second stator poles 445 so that the rotor 420 rotates. This can provide a motoring operation in the switched reluctance machine 400.

Tables 1-3 show various examples of switched reluctance machine configurations in accordance with the embodiments described herein. Table 1 illustrates example configurations of the number of rotor poles ($N_r$), the number of first stator poles ($N_{s1}$), and the number of second stator poles ($N_{s2}$) in a switched reluctance machine having three phases:

TABLE 1

Example configurations of SRMs with 3 phases

| $N_{ph}$ | $N_{s1}$ | $N_{s2}$ | $N_r$ |
|---|---|---|---|
| 3 | 6 | 12 | 10 |
|  | 6 | 18 | 16 |
|  | 6 | 24 | 22 |
|  | 12 | 24 | 20 |

Table 2 illustrates example configurations of the number of rotor poles ($N_r$), the number of first stator poles ($N_{s1}$) and the number of second stator poles ($N_{s2}$) in a switched reluctance machine having four phases:

TABLE 2

Example configurations of SRMs with 4 phases:

| $N_{ph}$ | $N_{s1}$ | $N_{s2}$ | $N_r$ |
|---|---|---|---|
| 4 | 8 | 16 | 14 |
|  | 16 | 32 | 28 |

Table 3 illustrates an example configuration of the number of rotor poles ($N_r$), the number of first stator poles ($N_{s1}$) and the number of second stator poles ($N_{s2}$) in a switched reluctance machine having five phases:

TABLE 3

Example configuration of SRM with 5 phases:

| $N_{ph}$ | $N_{s1}$ | $N_{s2}$ | $N_r$ |
|---|---|---|---|
| 5 | 10 | 20 | 18 |

Figure 5:
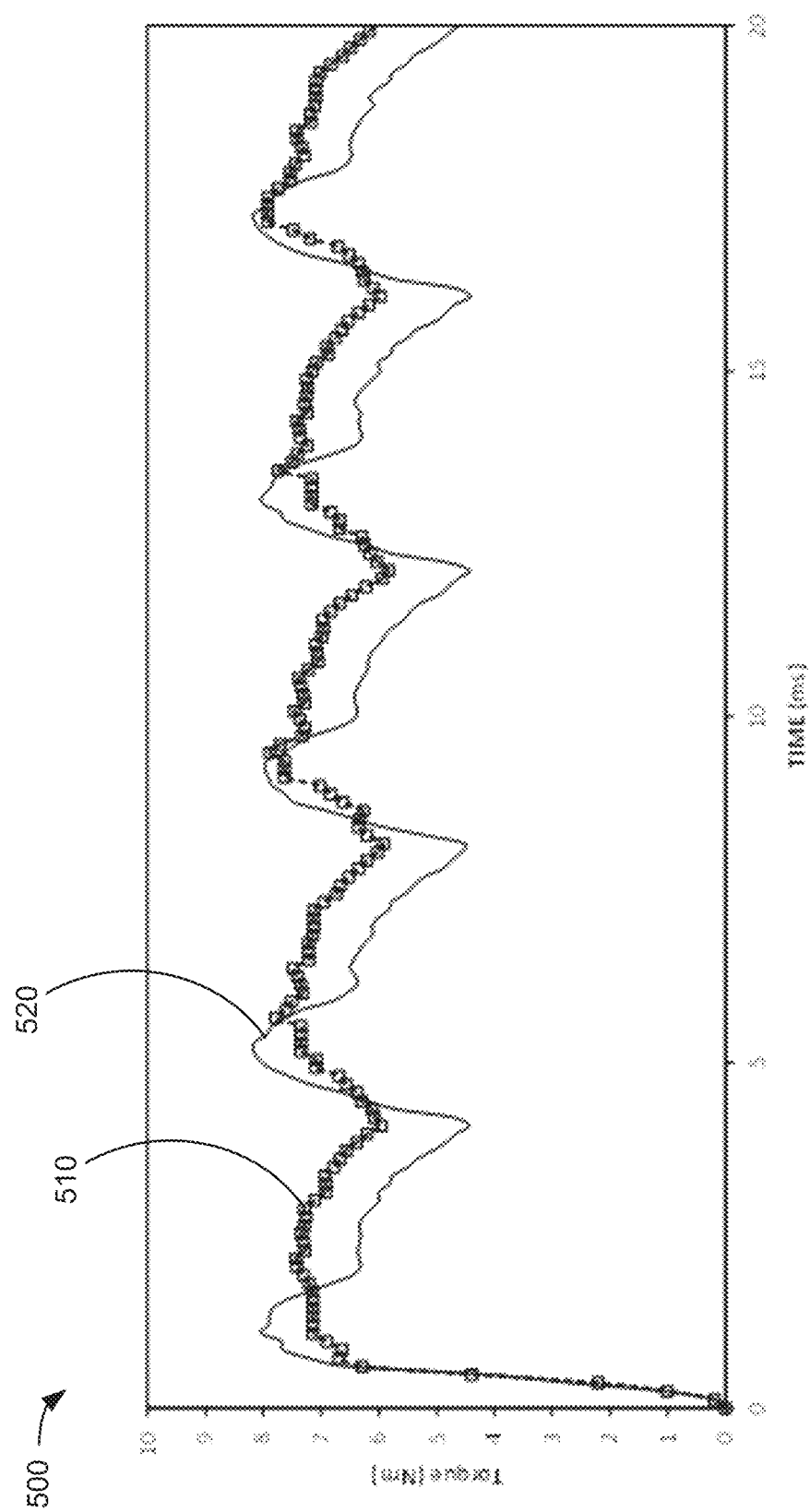
FIG. 5 shows an example plot of the torque waveform of the example switched reluctance machine of FIG. 3.

Referring now to FIG. 5, shown therein is a plot 500 illustrating the torque over time of a pair of switched reluctance machines. Plot 500 illustrates the torque waveform 510 of an example implementation of the switched reluctance machine 300 with six outer stator poles, twelve inner stator poles and ten rotor poles in which electrical coils are provided around only the first stator poles. The torque waveform 520 of a three-phase switched reluctance machine having six stator poles and ten rotor poles is also shown.

Both machines have the same outer diameter, air gap length, axial length, materials, stator pole angles and rotor pole angles. The current and voltage applied to both machines are also the same. The inventors have identified that switched reluctance machines in accordance with embodiments described herein can provide better torque quality. As shown in plot 500, the torque waveform 510 has less variation as compared to torque waveform 520, i.e. there is less torque ripple in switched reluctance machine 300.

Additionally, embodiments described herein may provide a shorter flux path through the switched reluctance machine. For instance, the relationship between the numbers of first stator poles, second stator poles and rotor poles may enable the flux path to be shortened (see e.g. FIG. 11).

Figure 6:
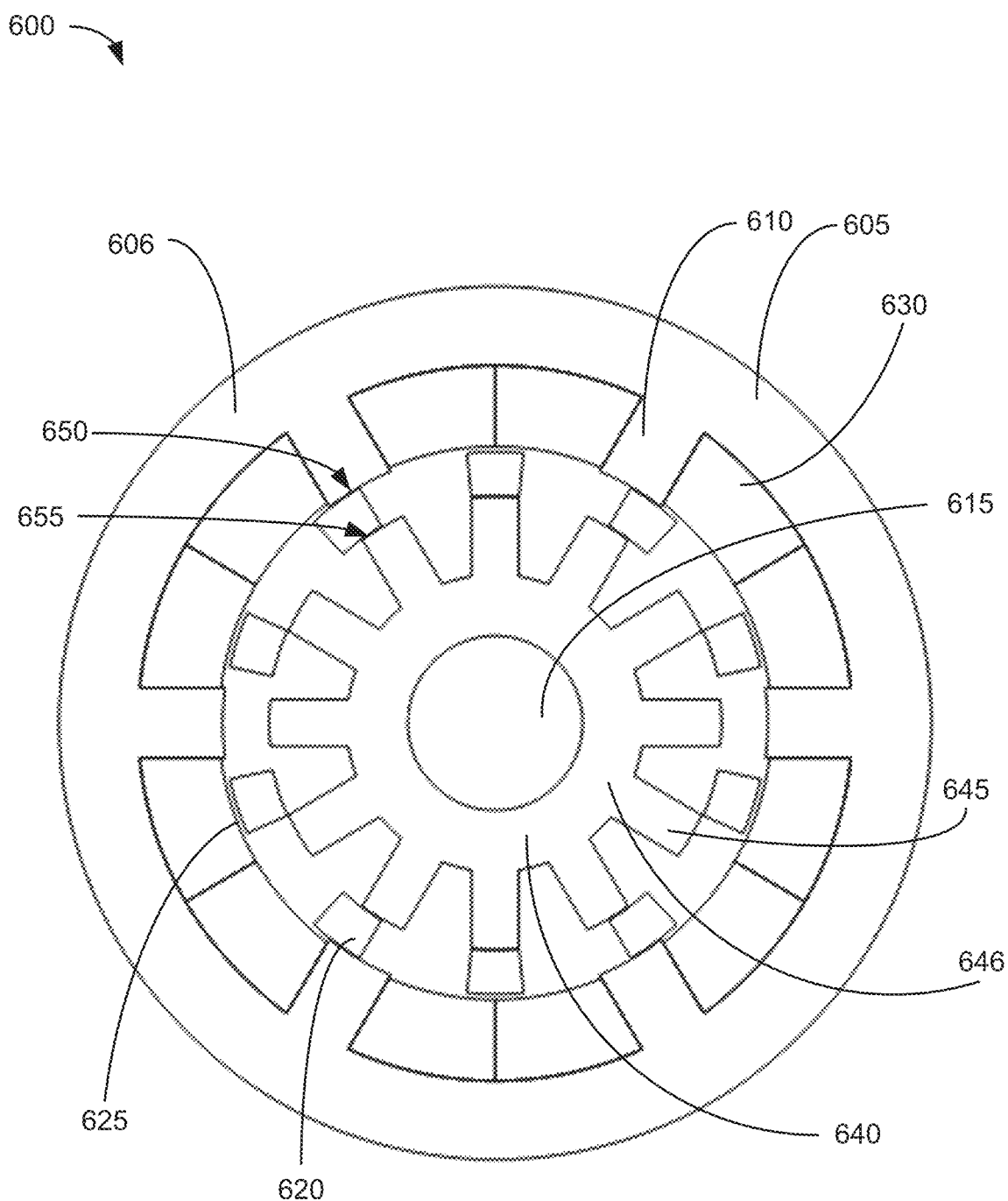
FIG. 6 shows a cross sectional view of another example switched reluctance machine in accordance with embodiment.

Referring now to FIG. 6, shown therein is another example embodiment of a switched reluctance machine 600. Switched reluctance machine 600 is an example of a switched reluctance machine in which the rotor is positioned between the second stator and the first stator. In the example shown, switched reluctance machine includes six outer stator poles, twelve inner stator poles and ten rotor poles.

Switched reluctance machine 600 includes a first (outer) stator 605, a second (inner) stator 640 and a rotor 620. The rotor 620 can be mounted to a rotatable shaft 615.

The shaft 615 can extend axially along a longitudinal direction of the switched reluctance machine 600. The shaft 615 may thus define a central longitudinal axis of the switched reluctance machine 600. The shaft 615 may define a rotation axis about which the rotor 620 is rotatable. As shown, the first stator 605, second stator 640 and rotor 620 can all be disposed concentrically and co-axially about the central axis of machine 600.

Alternately, the shaft may be positioned elsewhere within the switched reluctance machine 600. For example, the shaft may be coupled to one or both ends of the rotor 620.

In the example shown in FIG. 6, the rotor 620 is disposed between the second stator 640 and the first stator 605. The rotor 620 includes a plurality of teeth or protrusions. These protrusions define a plurality of salient rotor poles 625 of the rotor 620.

The first stator 605 is disposed concentrically with the rotor 620. The first stator 605 includes a stator core 606 and a plurality of salient teeth defining first stator poles 610. The first stator poles 610 protrude radially from the first stator core 606. As shown in FIG. 6, the stator poles 610 protrude radially inward from the stator core 606. The stator poles 610 may be spaced substantially evenly around the circumferential direction of the first stator 605. The space between stator teeth 610 that are adjacent one another around the circumference of the stator 605 may be referred to as a slot.

The switched reluctance machine 600 also includes a second stator 640. The second, inner stator 640 is disposed concentrically with the rotor 620 and the first stator 605. As with the first stator 605, the second stator 640 includes a plurality of second stator poles 645. The second stator poles 645 protrude radially outward from the second stator 640 towards the rotor poles 625. The plurality of second stator poles 645 are also spaced apart around the circumferential direction of the second stator 640 defining second stator slots therebetween.

The switched reluctance machines 600 also includes a plurality of electrical coils 630. The electrical coils 630 can be wound around the poles 610 of the first, outer stator 605. The coils 630 can be provided in a concentrated winding scheme about each pole 610.

As shown in FIG. 6, coils 630 are wound about only the first stator poles 610. That is, the switched reluctance machine 600 omits any electrical coils about the second stator poles 645. Accordingly, the second stator slots between adjacent poles 645 of the second stator 640 can be substantially void.

In some examples, the second stator 640 may thus omit any excitation source. Similarly, the switched reluctance machine 600 may also omit any excitation sources (i.e. magnets or electromagnets) on the rotor 620.

The plurality of electrical coils 630 can include a plurality of separate phase coils, i.e. coils corresponding to different phases of the switched reluctance machine. The electrical coils may thus define the plurality of phases of the switched reluctance machine 600. The switched reluctance machines described herein may include varying numbers of phases, however in general each switched reluctance machine includes at least three separate phases.

In general, the control and operation of the switched reluctance machine 600 may be similar to that of switched reluctance machine 300. An example of a magnetic flux path through the switched reluctance machine 600 is shown in FIG. 12.

Figure 12:
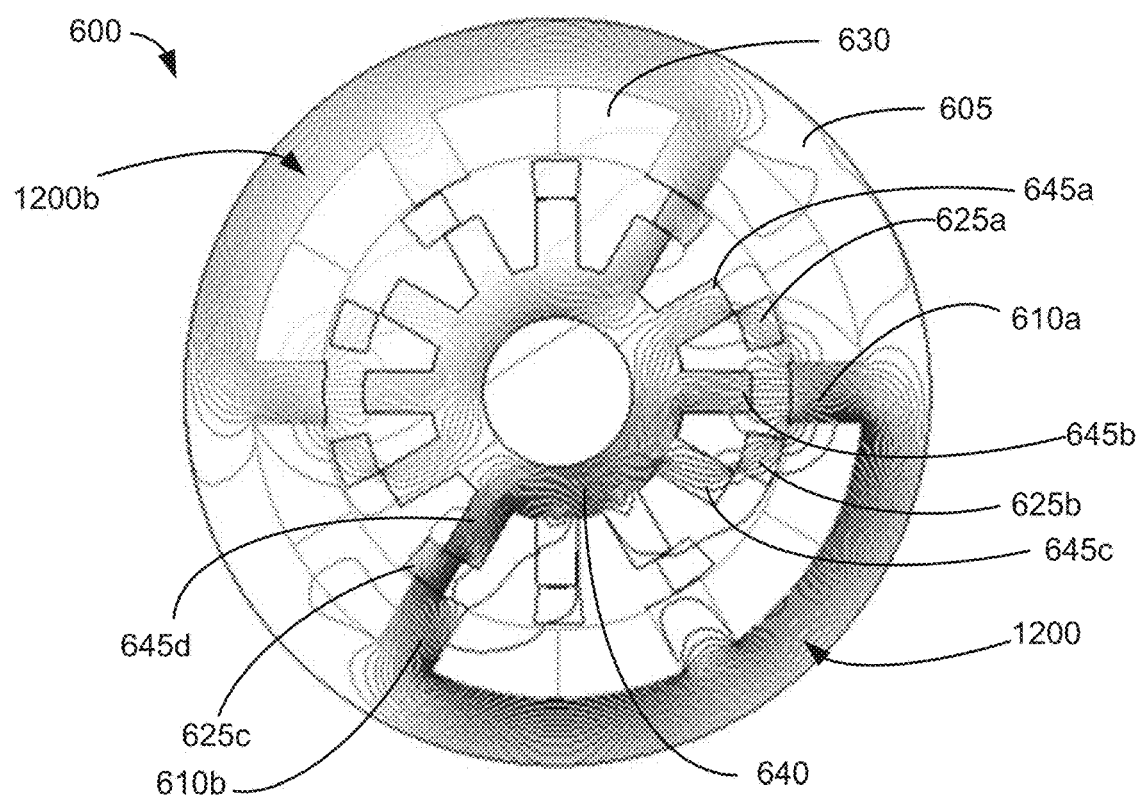
FIG. 12 shows a cross-sectional view of the switched reluctance machine of FIG. 6 with a magnetic flux path illustrated.

FIG. 12 illustrates an example magnetic flux path 1200 through switched reluctance machine 600. As shown in FIG. 12, flux induced in a first stator pole 610a can penetrate the air gap 650 between the first stator pole 610a and rotor poles 625a and 625b. The flux can then pass through the rotor poles 625a and 625b and penetrate the inner air gap 655 between the rotor poles 625a and 625b and inner stator poles 645a and 645c respectively. In addition, a portion of the magnetic flux can pass from the first stator pole 610a directly to second stator pole 645b. The flux can then enter the core 646 of the second stator via second stator poles 645a, 645b and 645c.

The flux can then travel along the second stator 640 to second stator pole 645d where it again penetrates the air gap 655 to rotor pole 625c. The flux then passes through rotor pole 625c, penetrates the outer air gap 650 and enters first stator pole 610b. The flux then enters the core 606 of stator 605 and returns to first stator pole 610a where it substantially completes the magnetic flux path 1200.

As will be appreciated, the direction of the magnetic flux path 1200 is described for clarity, and the path does not have a defined beginning or end. Additionally, a second magnetic flux path 1200b is also shown in FIG. 12. As shown in FIG. 12, the configuration of the switched reluctance machine 600 may provide a short flux path, which may assist in reducing iron losses.

The flux between the second stator poles 645, first stator poles 610 and the corresponding rotor poles 625 tends to align the rotor poles 625 with the first stator poles 610 so that the rotor 620 rotates. This can provide a motoring operation in the switched reluctance machine 600.

As with switched reluctance machines described herein (e.g. switched reluctance machines 300 and 400) in which the second stator is positioned between the rotor and the first stator, in embodiments of switched reluctance machine 600 described herein the relationship between the numbers of rotor poles, second stator poles, first stator poles, and phases may be defined to ensure a reduction in torque ripple.

As with embodiments in which the second stator is positioned between the rotor and the first stator, in embodiments where the rotor is positioned between the stators the number of first stator poles in the plurality of salient first stator poles can be defined as an integer multiple of the number of phases in the plurality of phases. For instance, the number of first stator poles in the plurality of salient first stator poles can be defined according to equation (10), which is reproduced here for clarity:

$$N_{s1} = N_{ph} \times gcd(N_{s1}, N_r) \qquad (10)$$

where $N_{s1}$ is the number of first stator poles in the plurality of salient first stator poles, $N_{ph}$ is the number of phases in the plurality of phases, $N_r$ is the number of rotor poles in the plurality of salient rotor poles, and gcd is the greatest common divisor.

As with embodiments in which the second stator is positioned between the rotor and the first stator, in embodiments where the rotor is positioned between the stators the number of second stator poles can be defined based on the number of rotor poles and the number of first stator poles. For the number of second stator poles in the plurality of salient inner stator poles can be defined according to equation (11), which is reproduced here for clarity:

$$N_{s2} = N_r + gcd(N_{s1}, N_r) \qquad (11)$$

where $N_{s1}$ is the number of first stator poles in the plurality of salient first stator poles, $N_{s2}$ is the number of second stator poles in the plurality of second stator poles, $N_r$ is the number of rotor poles in the plurality of salient rotor poles, and gcd is the greatest common divisor.

As with embodiments in which the second stator is positioned between the rotor and the first stator, in embodiments where the rotor is positioned between the stators the relationship between the number of poles on the second stator and the number of poles on the first stator can be further constrained. For instance, the number of second stator poles in the plurality of second stator poles may be defined as an integer multiple of the number of first stator poles in the plurality of salient first stator poles:

$$N_{s2} = k \times N_{s1} \qquad (12)$$

where k is an integer. In embodiments where the rotor is positioned between the stators, k can be any integer equal to or greater than 1.

Figure 7:
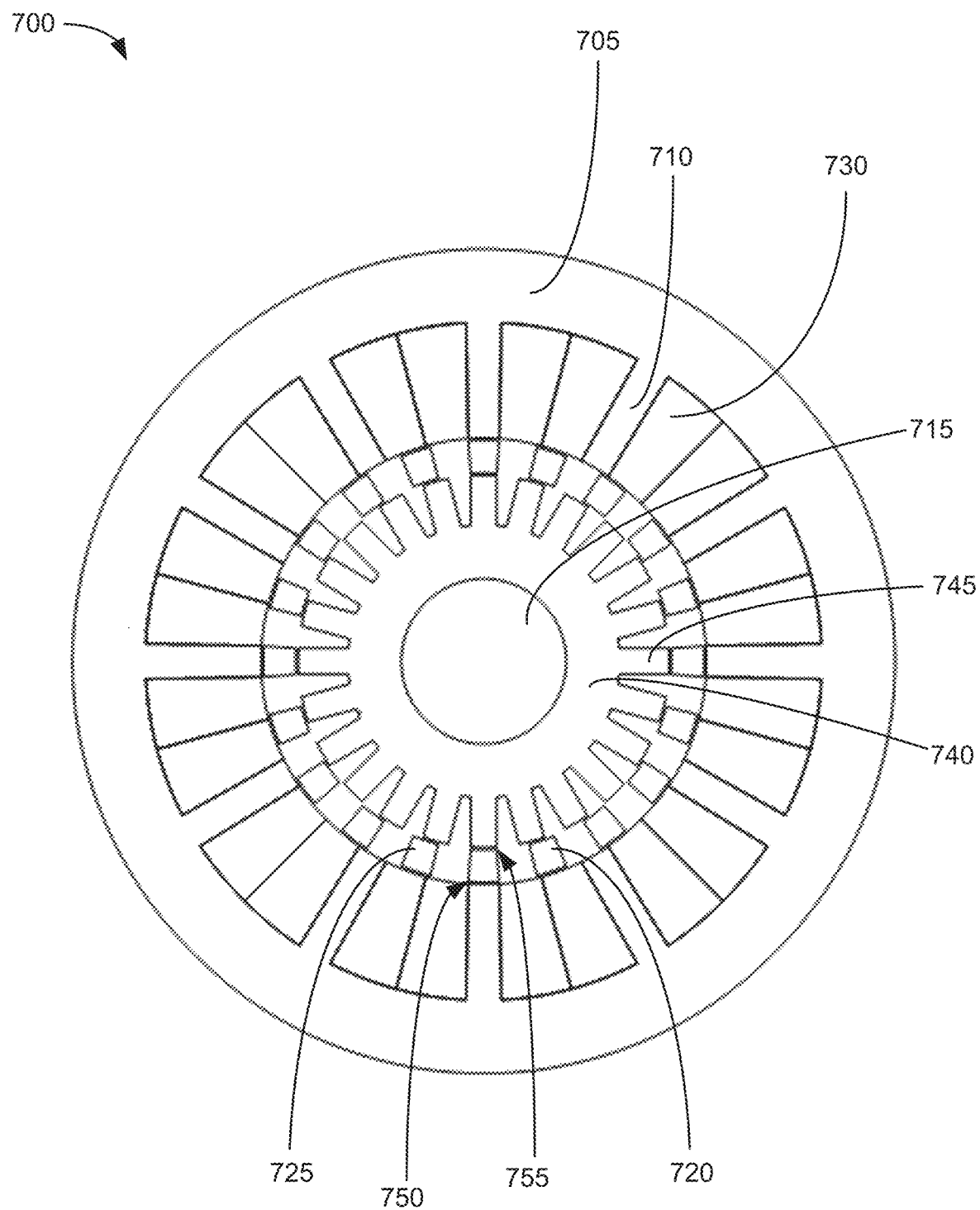
FIG. 7 shows a cross sectional view of another example switched reluctance machine in accordance with an embodiment.

Referring now to FIG. 7, shown therein is another example embodiment of a switched reluctance machine 700. Switched reluctance machine 700 is similar to switched reluctance machine 600 in that the rotor 720 is positioned between the second stator 740 and the first stator 705.

The rotor 720 can again be mounted to a rotatable shaft 715. The rotor 720, second stator 740 and first stator 705 can be disposed concentrically and co-axially in switched reluctance machine 700.

Switched reluctance machine 700 includes twelve outer stator poles 710, twenty-four inner stator poles 745 and twenty rotor poles 725. As with switched reluctance machine 600, switched reluctance machine 700 only includes electrical coils 730 wound around the first stator poles 710 (i.e. switched reluctance machine 700 omits any electrical coils around the second stator poles 745). The coils 730 define a plurality of phases for the switched reluctance machine 700, in this case three phases. The electrical coils 730 in machine 700 are arranged with concentrated windings around the stator teeth 710.

Electrical current can be provided to the coil windings 730 to induce an electromagnetic field. The coil windings 730 can thereby excite the stator poles 710 by inducing magnetic flux in the stator poles 710. The magnetic flux can then pass through the rotor 720 to the second stator poles 745. The rotor 720 can be rotatable to align the rotor poles 725 with the stator poles 710 as a result of the induced magnetic flux.

The flux can penetrate the air gap 750 between the first stator poles 710 and rotor poles 725. The flux can then penetrate the air gap 755 between the rotor poles 725 and the second stator poles 745 and go into the second stator 740. The flux between the first stator poles 710 and the corresponding rotor poles 725 tends to align the rotor poles 725 with the first stator poles 710 so that the rotor 720 rotates. This can provide a motoring operation in the switched reluctance machine 700.

Tables 4-6 show various examples of switched reluctance machine configurations with a rotor positioned between the second stator and first stator in accordance with the embodiments described herein. Table 4 illustrates example configurations of the number of rotor poles ($N_r$), the number of first stator poles ($N_{s1}$), and the number of inner stator poles ($N_{s2}$) in a switched reluctance machine having three phases:

TABLE 4

Example configuration of SRMs for 3 phases:

| $N_{ph}$ | $N_{s1}$ | $N_r$ | $N_{s2}$ |
|---|---|---|---|
| 3 | 6 | 10 | 12 |
|   | 6 | 16 | 18 |
|   | 6 | 22 | 24 |
|   | 12 | 20 | 24 |

Table 5 illustrates example configurations of the number of rotor poles ($N_r$), the number of first stator poles ($N_{s1}$), and the number of second stator poles ($N_{s2}$) in a switched reluctance machine having four phases:

TABLE 5

Example configuration of SRMs for 4 phase:

| $N_{ph}$ | $N_{s1}$ | $N_r$ | $N_{s2}$ |
|---|---|---|---|
| 4 | 8 | 6 | 8 |
|   | 8 | 14 | 16 |

Table 6 illustrates an example configuration of the number of rotor poles ($N_r$), the number of first stator poles ($N_{s1}$), and the number of second stator poles ($N_{s2}$) in a switched reluctance machine having five phases:

TABLE 6

Example configuration of SRM for 5 phase:

| $N_{ph}$ | $N_{s1}$ | $N_r$ | $N_{s2}$ |
|---|---|---|---|
| 5 | 10 | 18 | 20 |

Figure 8:
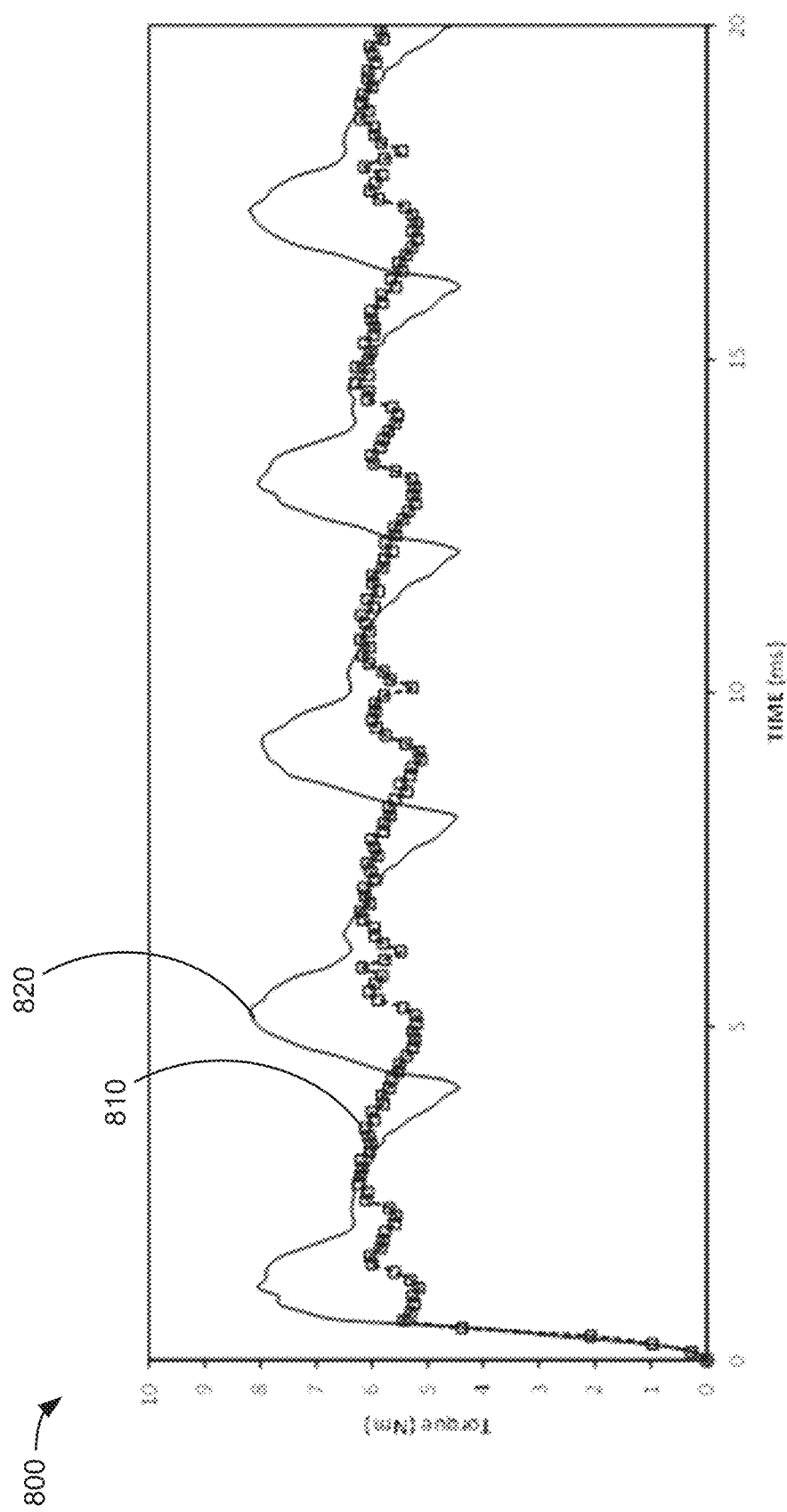
FIG. 8 shows an example plot of the torque waveform of the example switched reluctance machine of FIG. 6.

Referring now to FIG. 8, shown therein is a plot 800 illustrating the torque over time of a pair of switched reluctance machines. Plot 800 illustrates the torque waveform 810 of an example implementation of switched reluctance machine 600 with six outer stator poles, twelve inner stator poles and ten rotor poles in which electrical coils are provided around only the outer stator poles. The torque waveform 820 of a three phase switched reluctance machine with six stator poles and ten rotor poles is also shown.

Both machines have the same outer diameter, air gap length, axial length, materials, stator pole angles and rotor pole angles. The current and voltage applied to both machines are also the same. The inventors have identified that switched reluctance machines in accordance with embodiments described herein can provide better torque quality. As shown in plot 800, the torque waveform 810 has less variation as compared to torque waveform 820, i.e. there is less torque ripple in switched reluctance machine 600.

Additionally, embodiments described herein may provide a shorter flux path through the switched reluctance machine. The relationship between the numbers of first stator poles, second stator poles and rotor poles enables the flux path to be shortened (see e.g. FIG. 12).

Figure 9:
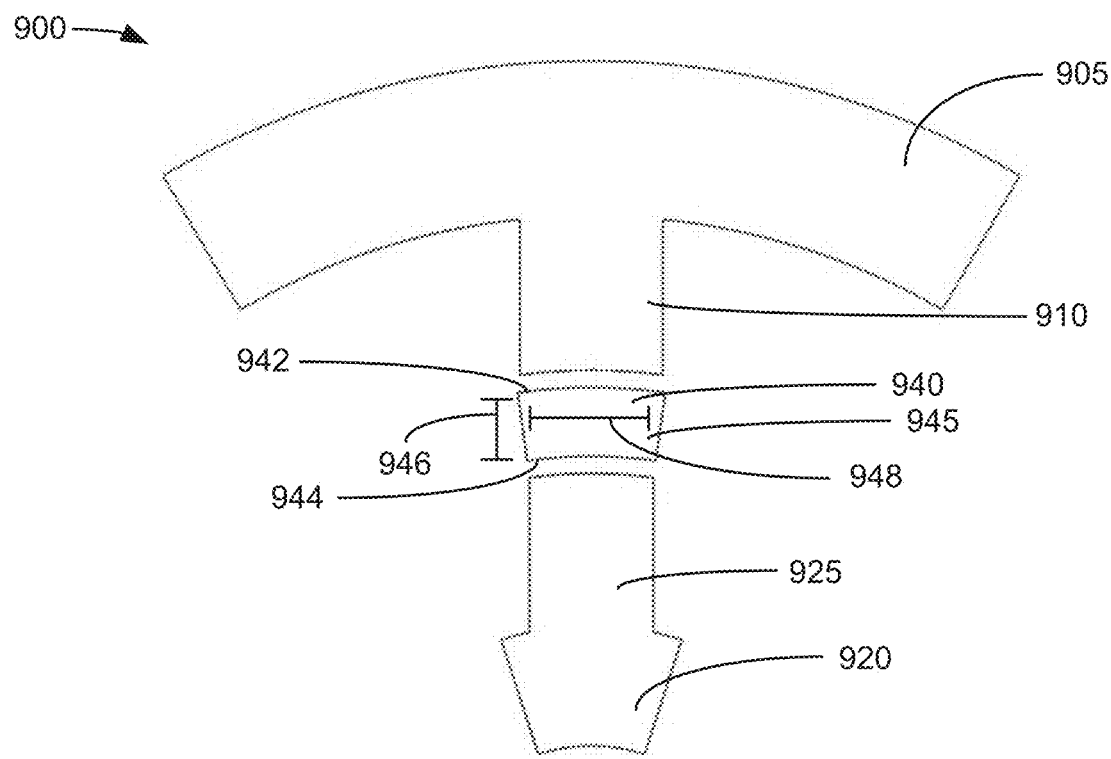
FIG. 9 shows a partial sectional view of the switched reluctance machine of FIG. 3 in accordance with an embodiment.

Referring now to FIG. 9, shown therein is a partial sectional view 900 of the switched reluctance machine 300 in accordance with an embodiment. As shown in FIG. 9, a portion of the first stator 905, second stator 940 and rotor 920 are shown, including a first stator pole 910, second stator pole 945 and rotor pole 925.

In order to further improve the torque quality of switched reluctance machine 300, the configuration of second stator 940 may be adjusted. The second stator 940 is positioned in the air gap of the switched reluctance machine 300. In SRM 300, energy conversion occurs in the air gap. Therefore, the parameters of the second stator 940 can directly affect the torque performance of switched reluctance machine 300.

A number of parameters of the second stator 940 may be adjusted to optimize the torque quality of switched reluctance machine 300. For instance, the outer stator-side angle 942, rotor-side angle 944, the thickness 946 (or radial width) of the second stator poles 945 and the width 948 (i.e. angular extent or circumferential width) of the second stator poles 945 may be adjusted to optimize torque quality.

Figure 10:
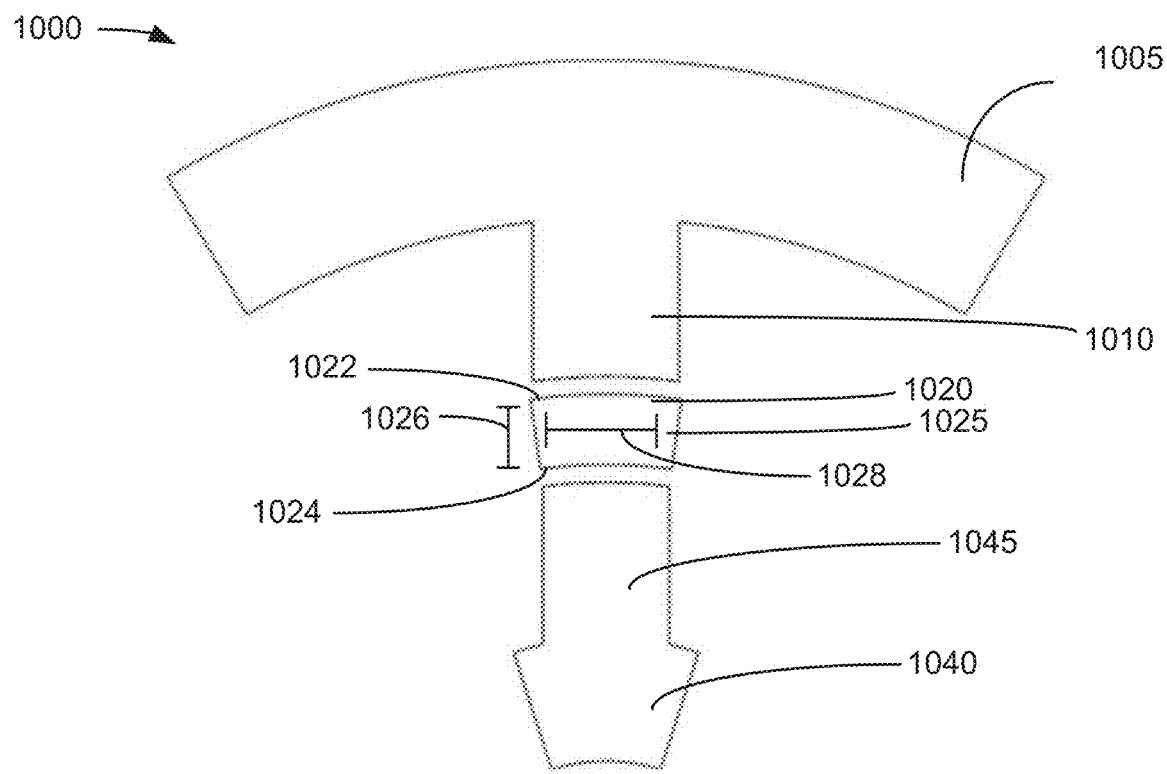
FIG. 10 shows a partial sectional view of the switched reluctance machine of FIG. 6 in accordance with an embodiment.

Referring now to FIG. 10, shown therein is a partial sectional view 1000 of the switched reluctance machine 600 in accordance with an embodiment. As shown in FIG. 10, a portion of the first stator 1005, second stator 1040 and rotor 1020 are shown, including a first stator pole 1010, second stator pole 1045 and rotor pole 1025.

In order to further improve the torque quality of switched reluctance machine 600, the configuration of rotor 1020 may be adjusted. The rotor 1020 is positioned in the air gap of the switched reluctance machine 600. As with SRM 300, energy conversion occurs in the air gap of switched reluctance machine 600. Therefore, the parameters of the rotor 1020 can directly affect the torque performance of switched reluctance machine 600.

A number of parameters of the rotor 1020 may be adjusted to optimize the torque quality of switched reluctance machine 600. For instance, the outer stator-side angle 1022, inner stator-side angle 1024, the thickness 1026 (i.e. radial width) of the rotor poles 1025 and the width 1028 (i.e. circumferential width or angular extent) of the rotor poles 1025 may be adjusted to optimize torque quality.

In embodiments described herein, the parameters of the second stator and/or rotor may be adjusted iteratively to optimize the performance of the switched reluctance machine. For instance, electromagnetic finite element analysis may be performed while iteratively adjusting the various parameters noted above to optimize the performance of a switched reluctance machine being manufactured.

Figure 13:
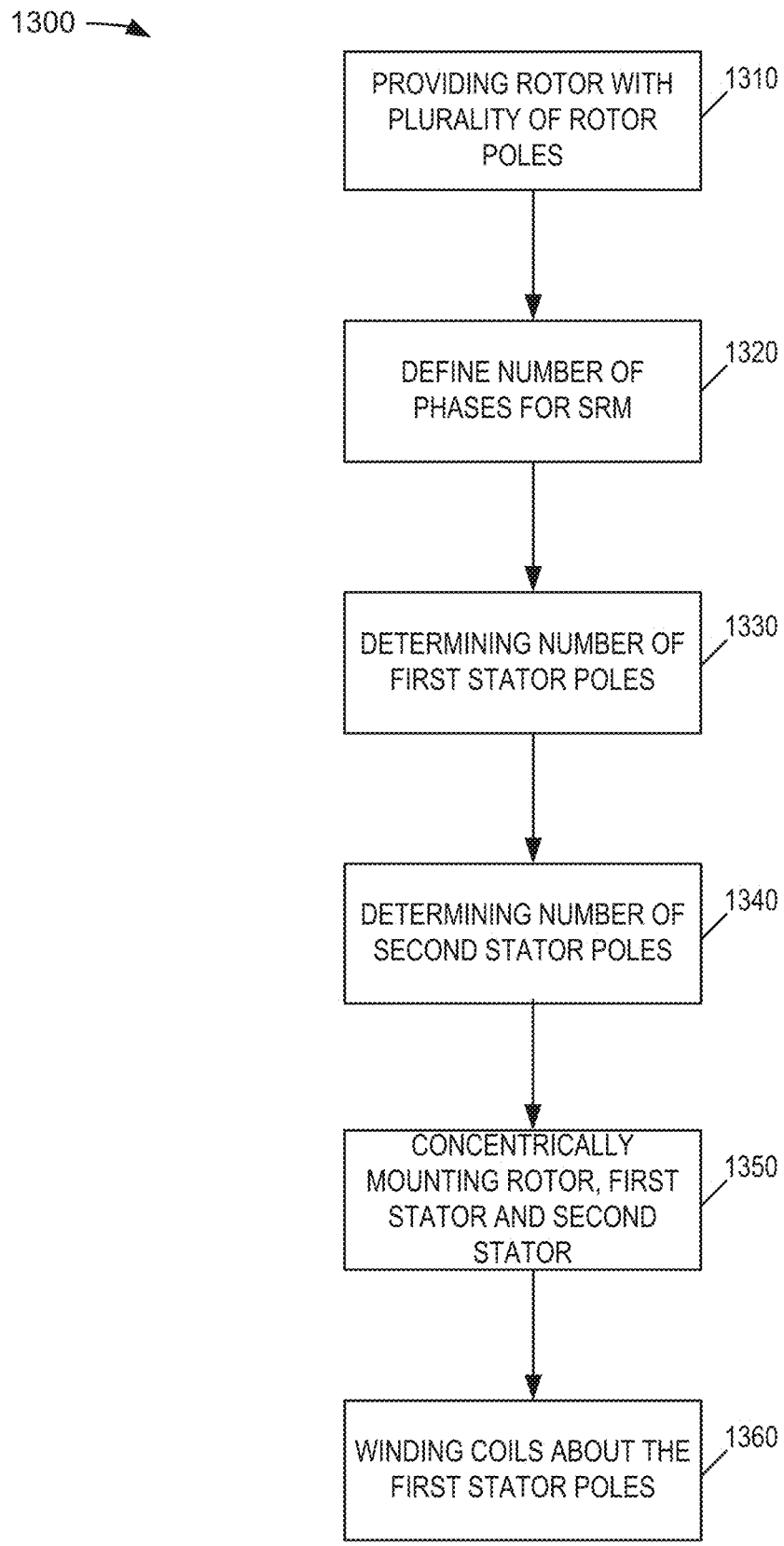
FIG. 13 shows a flowchart of an example process for manufacturing a switched reluctance machine in accordance with an embodiment.

Referring now to FIG. 13, shown therein is an example process 1300 for designing and manufacturing a switched reluctance machine. Process 1300 is an example of a method that may be used to design and manufacture a switched reluctance machine having a rotor and a pair of concentrically disposed stators, such as those described herein above. As will be appreciated, the specific order of steps in method 1300 may vary unless indicated otherwise.

At 1310, a rotor having a plurality of salient rotor poles can be provided. In embodiments where the rotor is positioned inward of the second stator, the rotor poles can protrude radially outward from the rotor.

At 1320, the number of phases for the switched reluctance machine can be defined. As described above, in general the switched reluctance machines used in the embodiments described herein can include at least three phases.

At 1330, the number of first stator poles (i.e. outer stator poles) can be determined using the number of rotor poles and the number of phases. For instance, the number of first stator poles can be determined using equation (10) described herein above.

At 1340, the number of second stator poles (i.e. inner stator poles) can be determined from the number of salient rotor poles and the number of first stator poles. For instance, the number of second stator poles can be determined using equation (11) described herein above.

At 1350, a first stator can be mounted concentrically with the rotor. A second, inner stator can also be mounted concentrically with the rotor and the first stator. In some embodiments, the second stator may be mounted between the rotor and the first stator. Alternatively, the second stator may be mounted inward of the rotor, i.e. the rotor can be disposed between the second stator and the first stator.

The first stator can have a plurality of salient first stator poles protruding radially from the first stator towards the rotor poles. The stator may include the number of first stator poles determined at 1330.

The second stator can have a plurality of salient second stator. The second stator may include the number of second stator poles determined at 1340.

At 1360, a plurality of electrical coils can be wound about the first stator poles. The coils may be wound about only the poles of the first stator and not the poles of the second stator (or rotor). The second stator and rotor may omit any excitation sources. The plurality of electrical coils can include a plurality of separate phase coils defining the number of phases of the switched reluctance machine from 1320.

As mentioned, in some embodiments the shape of the second stator or rotor may be optimized as part of the design and manufacturing process. In embodiments where the second stator is positioned between the rotor and the first stator, the shape of the second stator can be optimized to improve the torque quality of the switched reluctance machine.

The shape of the second stator can be optimized using finite element analysis. One or more parameters of the second stator can be adjusted in a software model of the second stator while the torque performance is analyzed using electromagnetic finite element analysis. For instance, one or more of an outer stator side angle, a rotor side angle, a second stator thickness, and a second stator pole circumferential width may be adjusted while performing analysis of the torque performance.

In some embodiments, the second stator may be optimized by adjusting the rotor-side angle between a plurality of angle increments from 1 degree to 15 degrees. The torque profile of the switched reluctance machine can then be analyzed for each angle increment using finite element analysis.

In some embodiments, the second stator may be optimized by adjusting the outer stator-side angle between a plurality of angle increments from 1 degree to 15 degrees. The torque profile of the switched reluctance machine can then be analyzed for each angle increment using finite element analysis.

In some embodiments, the second stator may be optimized by adjusting the stator thickness between a plurality of thickness increments from about 1 mm to about 6 mm. The torque profile of the switched reluctance machine can then be analyzed for each thickness increment using finite element analysis.

In some embodiments, the second stator may be optimized by adjusting the stator pole circumferential width between a plurality of pole width increments from $1/N_{s2}$ degree to $180/N_{s2}$ degrees. The torque profile of the switched reluctance machine can then be analyzed for each width increment using finite element analysis.

In some embodiments, the optimization of the second stator can also be performed while adjusting multiple parameters. For instance, an iterative optimization process may be used.

In embodiments where the rotor is positioned between the second stator and the first stator, the shape of the rotor can be optimized to improve the torque quality of the switched reluctance machine.

The shape of the rotor can be optimized using finite element analysis. One or more parameters of the rotor can be adjusted in a software model of the rotor while the torque performance is analyzed using electromagnetic finite element analysis. For instance, one or more of an outer stator-side angle, an inner stator-side angle, a rotor thickness, and a rotor pole circumferential width may be adjusted while performing analysis of the torque performance.

In some embodiments, the rotor may be optimized by adjusting the inner stator-side angle between a plurality of angle increments from 1 degree to 15 degrees. The torque profile of the switched reluctance machine can then be analyzed for each angle increment using finite element analysis.

In some embodiments, the rotor may be optimized by adjusting the outer stator-side angle between a plurality of angle increments from 1 degree to 15 degrees. The torque profile of the switched reluctance machine can then be analyzed for each angle increment using finite element analysis.

In some embodiments, the rotor may be optimized by adjusting the rotor thickness between a plurality of thickness increments from about 1 mm to about 6 mm. The torque profile of the switched reluctance machine can then be analyzed for each thickness increment using finite element analysis.

In some embodiments, the rotor may be optimized by adjusting the rotor pole circumferential width between a plurality of pole width increments from $1/N_{s2}$ degree to $180/N_{s2}$ degrees. The torque profile of the switched reluctance machine can then be analyzed for each width increment using finite element analysis.

In some embodiments, the optimization of the rotor can also be performed while adjusting multiple parameters. For instance, an iterative optimization process may be used.

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

The invention claimed is:

1. A switched reluctance machine comprising:
an axially extending shaft;
an axially extending rotor mounted to the shaft, the rotor having a plurality of salient rotor poles;
an axially extending outer stator disposed coaxially and concentrically with the rotor, the outer stator having a plurality of salient outer stator poles protruding radially from the outer stator towards the rotor poles;
a plurality of electrical coils wound about the outer stator poles, the plurality of electrical coils including a plurality of separate phase coils defining a plurality of phases of the switched reluctance machine, wherein the plurality of phases of the switched reluctance machine includes at least three phases; and
an axially extending inner stator disposed coaxially and concentrically with the rotor and the outer stator, the inner stator defining a plurality of second stator poles;
wherein electrical coils are wound about only the outer stator poles.

2. The switched reluctance machine of claim 1, wherein the inner stator is disposed between the outer stator and the rotor.

3. The switched reluctance machine of claim 1, wherein the rotor is disposed between the outer stator and the inner stator.

4. The switched reluctance machine of claim 1, wherein the number of outer stator poles in the plurality of salient outer stator poles is an integer multiple of the number of phases in the plurality of phases.

5. The switched reluctance machine of claim 4, wherein the number of outer stator poles in the plurality of salient outer stator poles is defined according to $N_{s1}=N_{ph} \times \gcd((N_{s1}, N_r)$,
wherein $N_{s1}$ is the number of outer stator poles in the plurality of salient outer stator poles, $N_{ph}$ is the number of phases in the plurality of phases, $N_r$ is the number of rotor poles in the plurality of salient rotor poles, and gcd is the greatest common divisor.

6. The switched reluctance machine of claim 1, wherein the number of inner stator poles in the plurality of inner stator poles is an integer multiple of the number of outer stator poles in the plurality of salient outer stator poles.

7. The switched reluctance machine of claim 1, wherein the number of inner stator poles in the plurality of inner stator poles is defined according to $N_{s2}=N_r+\gcd(N_{s1},N_r)$,
wherein $N_{s1}$ is the number of outer stator poles in the plurality of salient outer stator poles, $N_{s2}$ is the number of inner stator poles in the plurality of inner stator poles, $N_r$ is the number of rotor poles in the plurality of salient rotor poles, and gcd is the greatest common divisor.

8. A switched reluctance machine comprising:
a rotor having a plurality of salient rotor poles;
a first stator disposed concentrically with the rotor, the first stator having a plurality of salient first stator poles protruding radially from the first stator towards the rotor poles;

a plurality of electrical coils wound about the first stator poles, the plurality of electrical coils including a plurality of separate phase coils defining a plurality of phases of the switched reluctance machine; and a second stator disposed concentrically with the rotor and the first stator, the second stator defining a plurality of second stator poles;

wherein the switched reluctance machine omits any electrical coils wound about the second stator poles.

9. The switched reluctance machine of claim 8, wherein the second stator is disposed between the rotor and the first stator.

10. The switched reluctance machine of claim 8, wherein the rotor is disposed between the first stator and the second stator.

11. The switched reluctance machine of claim 8, wherein the switched reluctance machine has at least three phases defined by the plurality of electrical coils.

12. The switched reluctance machine of claim 8, wherein the number of first stator poles in the plurality of salient first stator poles is an integer multiple of the number of phases in the plurality of phases.

13. The switched reluctance machine of claim 12, wherein the number of first stator poles in the plurality of salient first stator poles is defined according to $N_{s1}=N_{ph}\times \gcd(N_{s1},N_r)$,
wherein $N_{s1}$ is the number of first stator poles in the plurality of salient first stator poles, $N_{ph}$ is the number of phases in the plurality of phases, $N_r$ is the number of rotor poles in the plurality of salient rotor poles, and gcd is the greatest common divisor.

14. The switched reluctance machine of claim 8, wherein the number of second stator poles in the plurality of second stator poles is an integer multiple of the number of first stator poles in the plurality of salient first stator poles.

15. The switched reluctance machine of claim 8, wherein the number of second stator poles in the plurality of second stator poles is defined according to $N_{s2}=N_r+\gcd(N_{s1},N_r)$,
wherein $N_{s1}$ is the number of first stator poles in the plurality of salient first stator poles, $N_{s2}$ is the number of second stator poles in the plurality of second stator poles, $N_r$ is the number of rotor poles in the plurality of salient rotor poles, and gcd is the greatest common divisor.

16. A method of manufacturing a switched reluctance machine, the method comprising:

providing a rotor having a plurality of salient rotor poles;

defining a number of phases for the switched reluctance machine;

determining a number of first stator poles from the number of salient rotor poles and the number of phases;

mounting a first stator concentrically with the rotor, the first stator having a plurality of salient first stator poles protruding radially from the first stator towards the rotor poles, wherein the plurality of salient first stator poles has the number of first stator poles;

determining a number of second stator poles from the number of salient rotor poles and the number of first stator poles;

mounting a second stator concentrically with the rotor and the first stator, the second stator having a plurality of second stator poles, wherein the plurality of second stator poles has the number of second stator poles; and winding a plurality of electrical coils about only the first stator poles, the plurality of electrical coils including a plurality of separate phase coils defining the number of phases of the switched reluctance machine.

17. The switched reluctance machine of claim 16, wherein the second stator is mounted between the rotor and the first stator.

18. The method of claim 17, further comprising:

optimizing a shape of the second stator using finite element analysis by analyzing at least one of an outer stator-side angle, a rotor-side angle, a second stator thickness, and a second stator pole circumferential width.

19. The switched reluctance machine of claim 16, wherein the rotor is mounted between the first stator and the second stator.

20. The method of claim 19, further comprising:

optimizing a shape of the rotor using finite element analysis by analyzing at least one of an outer stator-side angle, an inner stator-side angle, a rotor thickness, and a rotor pole circumferential width.

* * * * *